March 11, 1941. J. V. PENNINGTON 2,234,273
ROCK BIT CUTTER
Filed Feb. 19, 1940

Inventor
John V. Pennington.

By J. Vincent Martin
and
Ralph R. Browning.
Attorneys

Patented Mar. 11, 1941

2,234,273

UNITED STATES PATENT OFFICE 2,234,273

ROCK BIT CUTTER

John V. Pennington, Houston, Tex., assignor to Reed Roller Bit Company, Houston, Tex,. a corporation of Texas Application February 19, 1940, Serial No. 319,737

6 Claims. (Cl. 255—71)

This invention relates to a rock bit cutter, that is to a cutter of the type used in drill bits which are intended for drilling through hard rock formations. It has for its general object the provision of a rock bit cutter which will be capable of standing up under the hard usage to which such cutters are subjected and of performing efficiently over a long period of time.

Rock bits used in drilling wells are ordinarily of the roller type. That is, they consist of a body which is adapted to be rotated from the surface of the ground and which has rotatably mounted thereon one or more cutters adapted to enlarge the bottom of the hole being drilled. These cutters are customarily formed with teeth on their outer peripheries, such teeth somewhat resembling the gear teeth on a gear pinion. As these cutters roll over the surface of the formation the teeth tend to dig in and chip off parts of and otherwise to disintegrate the formation.

In order to make these bits drill rapidly a great amount of weight is permitted to bear on the bits during their rotation, this weight ordinarily being the weight of the long drill stems by which the bits are rotated. The large amount of weight placed on these bits tends to greatly damage the cutters which must sustain such weight. If such cutters are made relatively hard in order to withstand the wear incident to drilling, they are relatively easy to break, whereas if they are made soft and tough so that they will be less likely to break they will not take the wear.

It is the object of this invention therefore to provide such a roller cutter which will be hard enough to withstand the wear incident to drilling and yet strong enough so that it will not be readily broken.

It is a further object of this invention to provide a cutter of the type referred to the teeth of which will wear with a ragged edge and will constantly present new hard wearing surfaces to the formation.

Another object of this invention is to provide a cutter which may be manufactured relatively cheaply.

Other objects and advantages of this invention will become apparent from the following description in which are set forth by way of example certain embodiments of this invention.

Figure 1:
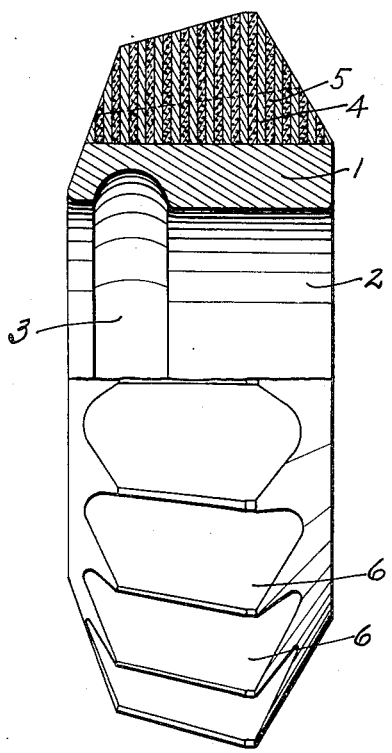
Fig. 1 is a view illustrating partly in elevation and partly in longitudinal cross section one embodiment of this invention.

The cutter illustrated in Fig. 1 is preferably formed with a core constructed of conventional low carbon steel or of any other suitable material. This core is formed on its inner surface with suitable bearing surfaces 2 and 3, it being understood that the nature of these bearing surfaces forms no part of the present invention and that the bearing surfaces may be of any suitable design.

Mounted on the exterior of the core 1 is the portion of the cutter which contacts the formation and actually performs the cutting operation. This portion consists of a plurality of laminations. The laminations are alternately of steel or the like as indicated at 4 and of some hard metal such as tungsten carbide or the like preferably in a steel matrix as indicated at 5.

These alternate layers are formed before they are placed on core 1. After being placed on core 1 they are electrically welded together under a very high pressure. It will be understood that these laminations will be formed so as to provide teeth 6 of more or less conventional outline.

Figure 2:
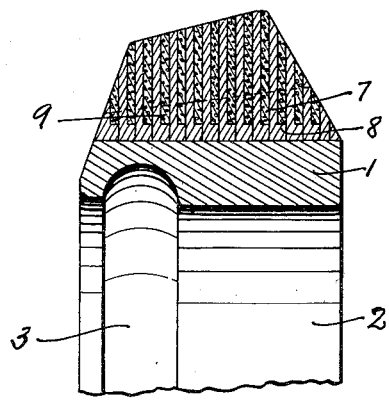
Fig. 2 is a view similar to the upper portion of Fig. 1 illustrating a slight modification.

In Fig. 2 the core 1 is of the same type illustrated in Fig. 1 and has suitable bearing surfaces 2 and 3. In this form however the steel laminations 7 are provided with annular outwardly facing shoulders 8 and the hard metal laminations 9 are made of slightly larger internal diameter so that they will fit around the shoulders 8. Thus, only the steel laminations will come in contact with the core 1, and the hard metal laminations will be supported on all surfaces ex pt their outer edges by the steel laminations.

Figure 3:
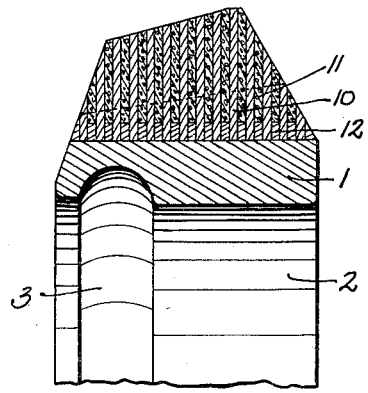
Fig. 3 is a view similar to Fig. 2 illustrating a still further modification.

In Fig. 3 the steel laminations 10 are the same as those illustrated at 4 in Fig. 1. Each of the hard metal laminations 11 however is provided with a small steel ring 12 around its inner periphery, this steel ring being of the same inner diameter as the steel rings 10.

The laminations and the core in Figures 2 and 3 are preferably secured to each other by electric welding as in the form shown in Fig. 1.

Figure 4:
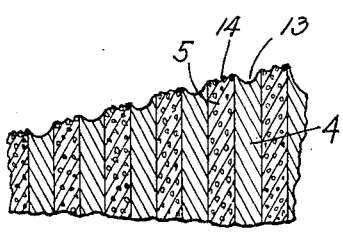
Fig. 4 is a view showing the manner in which a cutter constructed in accordance with this invention, will wear to continually present to the formation an efficient cutting surface.

In use, cutters constructed in the manner just described will due to the presence of the hard metal laminations be enabled to resist abrasion and wear to a very high degree. At the same time, they will be able to withstand heavy crushing loads due the support that is given to the hard metal laminations by the steel laminations and by the low carbon steel core In addition to the foregoing, it is noteworthy that such a cutter as herein described will wear when it does wear in the manner illustrated in Fig. 4. That is, the steel disks or laminations 4 will be more rapidly worn away as illustrated at 13 whereas the hard metal laminations 5 will not wear away so rapidly and will thus present projections like saw teeth as shown at 14. Even the surface of each of these projections will be uneven because of the presence of the hard metal within the steel matrix. Thus, as the cutter wears it will continually present a new ragged cutting edge capable of efficiently tearing down and breaking up the formation.

It will be seen from the foregoing that a cutter has been provided which is capable of withstanding the heavy loads to which cutters are customarily subjected and yet will have a long life. Such cutters also will be relatively cheap to manufacture because of their simple construction and of the small number of operations required in producing them.

Having described my invention, I claim:

1. A toothed roller cutter for drill bits comprising a core, a plurality of disc-like laminations of relatively soft, tough material surrounding said core, each of said laminations having a portion adjacent said core of a greater thickness than the remainder of the lamination and providing a seat for an intermediate disc-like lamination, an intermediate disc-like lamination of relatively harder material on each of said seats, all of said laminations being secured together to provide a cutting part having alternate portions of relatively soft, tough material and of relatively harder cutting material and axially extending teeth formed on the outer periphery of the disc-like laminations.

2. A toothed roller cutter for drill bits comprising a core and a cutting portion on said core composed of a plurality of disc-like laminations, alternate laminations being of relatively tough, soft material and of relatively harder material, a portion of relatively soft material between the core and the laminations of relatively harder material, all of said laminations being secured together to form a cutting portion having alternate areas of relatively soft, tough material and of relatively hard cutting material and axially extending teeth formed on the outer periphery of the disc-like laminations.

3. A toothed roller cutter for drill bits comprising a tubular bearing core of a relatively soft material, a plurality of annular disc-like plates of relatively soft material mounted co-axially on said core in axially spaced relation, a plurality of annular disc-like plates of relatively harder material mounted on said core between adjacent ones of said spaced plates of relatively soft material, said soft and hard plates having their outer peripheries serrated in the form of teeth with the teeth of all of said plates registering with each other, and said plates and core being fixed together.

4. A toothed roller cutter for drill bits comprising a tubular bearing core of a relatively soft material, a plurality of annular disc-like plates of relatively soft material mounted co-axially on said core in axially spaced relation, a plurality of annular disc-like plates of relatively harder material mounted on said core between adjacent ones of said spaced plates of relatively soft material, said soft and hard plates having their outer peripheries serrated in the form of teeth with the teeth of all of said plates registering with each other, said plates and core being fixed together, and each of said annular disc-like plates of harder material having a bushing of relatively soft material interposed between the inner surface thereof and the outer surface of the core.

5. A toothed roller cutter for drill bits comprising a tubular bearing core of a relatively soft material, a plurality of annular disc-like plates of relatively soft material mounted co-axially on said core in axially spaced relation, a plurality of annular disc-like plates of relatively harder material mounted on said core between adjacent ones of said spaced plates of relatively soft material, said soft and hard plates having their outer peripheries serrated in the form of teeth with the teeth of all of said plates registering with each other, and said plates and core being fixed together, each of said annular disc-like plates of relatively harder material having a bushing of relatively soft material interposed between the inner surface thereof and the outer surface of the core, said bushings being integral with the plates of relatively soft material.

6. A toothed roller cutter for drill bits comprising a tubular bearing core of low carbon steel, a plurality of annular disc-like plates of steel mounted co-axially on said core in axially spaced relation, a plurality of annular disc-like plates of tungsten-carbide mounted on said core between adjacent ones of said spaced plates of steel, said steel and tungsten-carbide plates having their outer peripheries serrated in the form of teeth with the teeth of all of said plates registering with each other, and said plates and core being fixed together.

JOHN V. PENNINGTON.